United States Patent
Tellatin

(10) Patent No.: US 12,464,628 B2
(45) Date of Patent: Nov. 4, 2025

(54) LIGHTING SYSTEM AND CONTROL METHOD OF SAID SYSTEM

(71) Applicant: LEDWORKS SRL, Milan (IT)

(72) Inventor: Andrea Tellatin, Milan (IT)

(73) Assignee: LEDWORKS SRL, Milan (IT)

( * ) Notice: Subject to any disclaimer, the term of this patent is extended or adjusted under 35 U.S.C. 154(b) by 157 days.

(21) Appl. No.: 18/027,662

(22) PCT Filed: Sep. 24, 2021

(86) PCT No.: PCT/IB2021/058713
§ 371 (c)(1),
(2) Date: Mar. 22, 2023

(87) PCT Pub. No.: WO2022/064435
PCT Pub. Date: Mar. 31, 2022

(65) Prior Publication Data
US 2023/0389165 A1 Nov. 30, 2023

(30) Foreign Application Priority Data
Sep. 28, 2020 (IT) .................. 102020000022852

(51) Int. Cl.
*G03B 3/00* (2021.01)
*G03B 5/00* (2021.01)
(Continued)

(52) U.S. Cl.
CPC .......... *H05B 47/19* (2020.01); *H05B 47/155* (2020.01)

(58) Field of Classification Search
CPC ...... H05B 47/19; H05B 47/155; H05B 45/20; H05B 47/125; H05B 47/165; Y02B 20/40;
(Continued)

(56) References Cited

U.S. PATENT DOCUMENTS

2010/0271476 A1   10/2010  Damink et al.
2010/0309391 A1*  12/2010  Plut ...................... H04N 9/3147
                                                        345/1.3
(Continued)

FOREIGN PATENT DOCUMENTS

WO   2017115326 A1   7/2017

OTHER PUBLICATIONS

International Search Report, PCT/IB2021/058713, Feb. 14, 2022.

*Primary Examiner* — Minh Tran
(74) *Attorney, Agent, or Firm* — Falcon Rappaport & Berkman

(57) ABSTRACT

Lighting system comprising at least one lighting device configured to emit a light source, which comprises a control unit configured to activate the lighting device according to a predetermined lighting program, a user device adapted to communicate with the control unit being present.
The lighting device comprises a plurality of lighting elements, each lighting element being configured to respond to control messages comprising an identification code of the lighting element and being configured to project a light point onto a projection surface, such that each projected light point is associated with a lighting element, the control unit and the user device being configured to detect the spatial position of at least part of the light points, the control unit being configured to implement a lighting program which takes into account the spatial positions of the determined light points.

19 Claims, 3 Drawing Sheets

(51) Int. Cl.
*G03B 27/54* (2006.01)
*G03B 27/72* (2006.01)
*H05B 47/155* (2020.01)
*H05B 47/19* (2020.01)

(58) Field of Classification Search
CPC .... G03B 21/2033; G03B 21/204; G03B 3/00; G03B 5/00; G03B 21/00; G03B 17/00; G03B 21/005
See application file for complete search history.

(56) References Cited

U.S. PATENT DOCUMENTS

| | | | |
|---|---|---|---|
| 2017/0374244 A1* | 12/2017 | Swaminathan | H01S 5/426 |
| 2018/0227555 A1* | 8/2018 | Engelen | G06T 7/70 |
| 2018/0295699 A1* | 10/2018 | Franciosa | H05B 47/155 |

* cited by examiner

LIGHTING SYSTEM AND CONTROL METHOD OF SAID SYSTEM

The present invention relates to a lighting system comprising at least one lighting device configured to emit a light source.

The lighting device comprises a control unit configured to operate said lighting device according to a predetermined lighting program.

There is also a user device adapted to communicate with said control unit and comprising a camera for capturing a sequence of images of the environment in which the lighting device is positioned.

The present invention relates in particular to light decoration systems and to the control methods of such systems.

Currently, scenic effects are obtained on the basis of choreographies and animations made by strips of light bulbs, preferably LEDs, which are activated independently and according to predetermined sequences, in order to obtain the desired effect.

An example of a possible configuration is described in patent application WO2017115326.

Therefore, in the systems known in the state of the art, one or more LED strips are provided which are installed in the environment, for example resting on objects or positioned on the walls of buildings or various structures.

In the case of medium/large installations, such as the installation of LED strips on buildings, there are several problems with the systems known in the state of the art.

Firstly, problems related to the installation, i.e., the assembly/disassembly of the LED lights and the fixing of the latter on the building, which requires long times and consequent costs.

Furthermore, the installation on buildings must be done in accordance with standards, i.e., it must meet all the requirements related to safety regulations, involving insurance companies and installation tools such as lifts, stairs, etc.

Furthermore, the installation of LED strips on buildings prevents their presence at any time of the year, for aesthetic reasons, requiring the presence of labour only at specific periods for the installation of said strips.

The buildings also do not have regular surfaces, but include windows, terraces and architectural elements which make installation difficult and do not allow a homogeneous arrangement of the LEDs, an aspect which also affects the aesthetic effect of the animations to be obtained.

To face the problems described, some systems known in the state of the art include carrying out permanent installations of LEDs, in order to avoid the costs related to the disassembly of and securing the systems.

However, permanent installation is unsatisfactory, as it includes depositing an electrical cable, i.e., the cable connecting the LEDs inside the strip, which is an unpleasant element from an aesthetic point of view, especially on buildings of important historical/artistic value.

Furthermore, atmospheric agents, especially the sun, deteriorate the cable, compromising the correct functioning of the entire lighting system.

There is therefore an unmet need by the systems known in the state of the art to create a lighting system which solves the disadvantages described above, in particular which limits the installation costs and which can be used inside any environment and installed on any building, without disturbing the aesthetics of the building itself or requiring complex installations, so as to be used at any time of the year.

The present invention achieves the above objects by making a device as previously described, in which the lighting device comprises a plurality of lighting elements.

Each lighting element is configured to respond to control messages comprising a lighting element identification code and to project a light point onto a projection surface, such that each projected light point is associated with a lighting element.

Furthermore, the control unit and the user unit are configured to detect the spatial position of at least part of the light points.

The control unit is finally configured to implement a lighting program which takes into account the spatial positions of the determined light points.

The system object of the present invention therefore includes the creation of scenographies, light configuration, without requiring the installation of wires and/or bulbs, but through the generation of light points projected onto a surface.

It is evident how such a configuration allows to solve all the disadvantages of installation of the systems known in the state of the art, allowing to obtain savings both in terms of costs and in terms of time and to fully exploit the lighting system not only for decorative purposes, but also for signalling purposes.

The projected light points replace the light effect created by the LEDs inside the LED strips of the systems known in the state of the art, for which the same scenic effect is obtained, projecting the light, without the need for complex installations.

Furthermore, since the position of the light points is detected on the projection surface, such a detection is not affected by the installation distance of the lighting device with respect to the projection wall.

The layout of the light points, i.e., their arrangement on the projection wall, varies according to the installation distance of the lighting device, but also according to how many lighting devices are present and their position "on the ground", for example it is possible to have projected light points which overlap or mix if the two lighting devices project their respective light points in a common or partial surface, or it is possible that the areas projected by each lighting device have a different size if the latter have different distance from the wall), but this aspect is irrelevant since the position of the light points is detected as they are arranged on the projection surface.

For the detection of the position of the light points, one of any of the methods known in the state of the art can be used.

Preferably the method described in patent application WO2017115326 is used, the contents of which are to be considered an integral part of the present application.

In accordance with the content of the aforesaid patent, in order to simplify the procedure for detecting the position of the light points, the user device comprises a camera for capturing a sequence of images of the environment in which the lighting device is positioned, in particular of the projection surface.

The control unit is instead configured to implement a system configuration step in which it activates each lighting element according to a respective switching on sequence dictated by the user device, while the user device is configured to analyse a sequence of images first provided to the control unit and then acquired during the system configuration step to determine the spatial position of each light point on the projection surface and/or the identification code of the lighting element associated with the light point and to send information to the control unit related to the spatial position of each light point projected and the identification code of the associated lighting element.

According to a preferred embodiment, the lighting elements consist of RGB laser emission elements or combinations of specific colours.

The lighting device is therefore configured as a sort of bulb which has an RGB laser matrix for the emission of the light source.

The system object of the present invention and the control method of said system, allow to simplify the production process of such a bulb, since the laser beams emitted by the bulb can also cross each other or have different dimensions, but the result will still be a plurality of points projected on a surface, of which the system object of the present invention calculates the position and knows the identification code of the lighting elements associated with each light point.

Furthermore, the laser has a point-like light, thus it is not affected by the installation distance of the lighting device, each projected point will always be in focus, so as to always achieve an aesthetically pleasing light effect.

According to a possible embodiment, the bulb can have three RGB lasers whose three beams are deflected to end up on a single beam obtained from the union of the three beams. This single beam is sent to a mirror whose position can be changed very quickly so as to have 1,500 light points for 30 fps (frames per second) equal to 45,000 different angles per second.

The system object of the present invention is particularly advantageous in the case of the presence of two or more lighting devices.

The lighting devices are arranged so as to project the light source onto a common projection surface.

Therefore, regardless of the number of bulbs and the installation distance with respect to the projection surface, the system object of the present invention allows the creation of light scenographies by controlling the activation of the lighting elements of the bulbs.

Thus, the invention allows to have a system of one or more lighting devices, whose scenographies are not affected by the positioning distance of the devices themselves, since the image drawn on the projection wall is calculated based on the projected points of the various lighting devices.

Consequently, even if one device is closer and the other more distant than the projection wall and non-uniform areas are created therebetween, this is of little relevance for the aesthetic creation of the scenography made.

Given the advantageous aspects related to the above-described system, the present invention also relates to a method for controlling the switching on of lights emitted by at least one lighting device.

According to a preferred embodiment, the method object of the present invention includes the use of the described system, according to one or more of the variant embodiments presented.

The method includes the following steps:
a) projecting a plurality of light points onto a projection surface,
b) associating at least part of the projected light points with the corresponding lighting elements and detecting the position of the light points,
c) determining a switching on sequence of the lighting elements so that the lighting elements emit lights according to a lighting program, said lighting program including the projection of the light points according to a predetermined spatial order.

As anticipated, the association of the light points with the corresponding lighting elements allows to control the generation of the light points based on the activation of the lighting elements.

Preferably, in order to improve the creatable scenographies and the scenic effect obtained, the method object of the present invention includes associating all the light points with a corresponding lighting element and detecting the position of all the light points.

In accordance with a preferred embodiment, step b) includes the steps of:
capturing a sequence of images of the projection surface,
during the capture of the sequence of images, switching on at least part of the lighting elements according to a different sequence, which sequence allows to uniquely identify the light points associated with said lighting elements,
analysing the sequence of images to determine a spatial position of the light points.

A similar methodology is described in patent application WO2017115326 and, in this case, is applied to the light points and not to individual lighting devices, such as LEDs or the like.

The method however does not change, the object is to detect the position of the projected light points and each light point is associated with an identification code related to the lighting element which generated the projection of such a light point.

Advantageously, each lighting element is configured to respond to control messages comprising an identification code, while the sequence comprises a plurality of switching on configurations of the lighting elements, each switching on configuration including the activation of the lighting elements according to different colourations.

As previously described for the system, also the method object of the present invention includes step of positioning two or more lighting devices, so as to project the light source on a common projection surface.

In order to limit the number of captures by the camera of the user device, N images are captured, where N is the lowest integer satisfying the equation S^N>=L, with L being the number of the lighting elements and S being the number of states which can be assumed by each lighting element.

Preferably the user device consists of a portable device of the smartphone type or the like and so that the lighting program can be set by a user by means of such a smartphone operatively connected to a control unit adapted to control the switching on of said lighting elements.

The variants of the system and of the method of the present invention just discussed have been described with reference to a two-dimensional projection surface.

However, a three-dimensional projection surface can be included by positioning multiple lighting devices around the surface without in any way limiting the operation and efficiency of the system and method object of the present invention.

In such a case, the method object of the present invention includes steps aimed at determining the three-dimensional position of the light points.

In particular, the method comprising the following steps:
b1) projecting the plurality of light points,
b2) determining the positions of at least part of the light points with respect to a single point of view, by capturing, by means of a camera, a two-dimensional model of the positions of at least part of the light points,
b3) processing the two-dimensional models captured to obtain a three-dimensional model, b4) moving the camera in order to obtain a new two-dimensional model of the plurality of light points, according to a different point of view, b5) repeating steps b3) and b4) until a complete three-dimensional model is obtained.

The three-dimensional model is then calculated based on the captured two-dimensional models.

Furthermore, the activation of the lighting elements and the consequent projection of the light points, according to a certain lighting state based on the three-dimensional model calculated from time to time, is provided to guide the subsequent captures.

In accordance with what is described, each light point, to be identified, must be present in at least three two-dimensional models captured.

The method thus generates lighting configurations, i.e., activates the lighting elements according to different lighting states on the basis of the three-dimensional model calculated from time to time in order to guide the camera's movement, so that the capture of the next two-dimensional model is limited and aimed at the light points not yet fully identified.

The capture can be carried out either manually by a user, or automatically, by means with autonomous mobility for capturing images, which automatically receive instructions to acquire, gradually, only not yet fully identified light points.

Hence the method can store the two-dimensional models and process them, according to predetermined time intervals, to obtain the three-dimensional model.

For example, it can be included to capture a predefined number of two-dimensional models, preferably three or more, and generate the three-dimensional model.

Preferably, the two-dimensional models are obtained by capturing a sequence of projection surface images and processing said sequence of images, exactly as described above and in accordance with WO2017115326.

In particular, the lighting elements are activated according to different predetermined lighting states based on the number of captured two-dimensional spatial detections.

The term two-dimensional spatial detection identifies a lighting element, and the light point associated therewith, whose position has previously been detected in a two-dimensional model.

Preferably, each capture includes comprising at least one previously detected light point.

For this reason, the camera is moved so that the two-dimensional models always contain at least one light point whose position has been previously detected in a two-dimensional model.

Preferably downstream of each scan, a three-dimensional model of the light points is reconstructed.

Preferably, the lighting state is relative to the light emission according to a certain colouration.

According to a possible embodiment, following the capture of one or more two-dimensional models, a step of sending said model to a central unit is included, which generates a configuration of lighting states of each lighting element.

The creation of three-dimensional models in combination with the presence of two or more lighting devices allows to obtain advantageous aspects.

In fact, it will be possible to arrange the lighting devices around a three-dimensional object, project images or scenes on the object itself to control the activation of the devices so as to create scenes of the user's choice, not limited to a flat projection surface, but arranged on a three-dimensional object.

As described above, these scenes can be made and controlled regardless of the positioning distance of the lighting devices with respect to the three-dimensional object.

Preferably, as will be subsequently described, a synchronization of operation of the lighting devices is included.

These and other features and advantages of the present invention will become clearer from the following description of some exemplary embodiments illustrated in the accompanying drawings in which.

It is specified that the figures annexed to the present patent application indicate some embodiments of the method and system object of the present invention to better understand the specific advantages and features thereof.

Such embodiments are therefore to be understood for explanatory purposes and not limited to the inventive concept of the present invention, i.e., to create a lighting system and a control method of said system, capable of creating scenographies, light configurations, without including the installation of wires and/or bulbs, but through the generation of light points projected onto a surface.

The lighting system object of the present invention comprises at least one lighting device 1 configured to emit a light source, at least one user device 3 configured to communicate with the lighting device 1.

The lighting device 1 further comprises a control unit 11 configured to activate the lighting device according to a predetermined lighting program.

Furthermore, the lighting device 1 comprises a plurality of lighting elements 1a-1h, configured to respond to control messages comprising an identification code and to project a light point on a projection surface 2, such that a lighting element 1a-1h is associated with each light point.

Figure 2A:
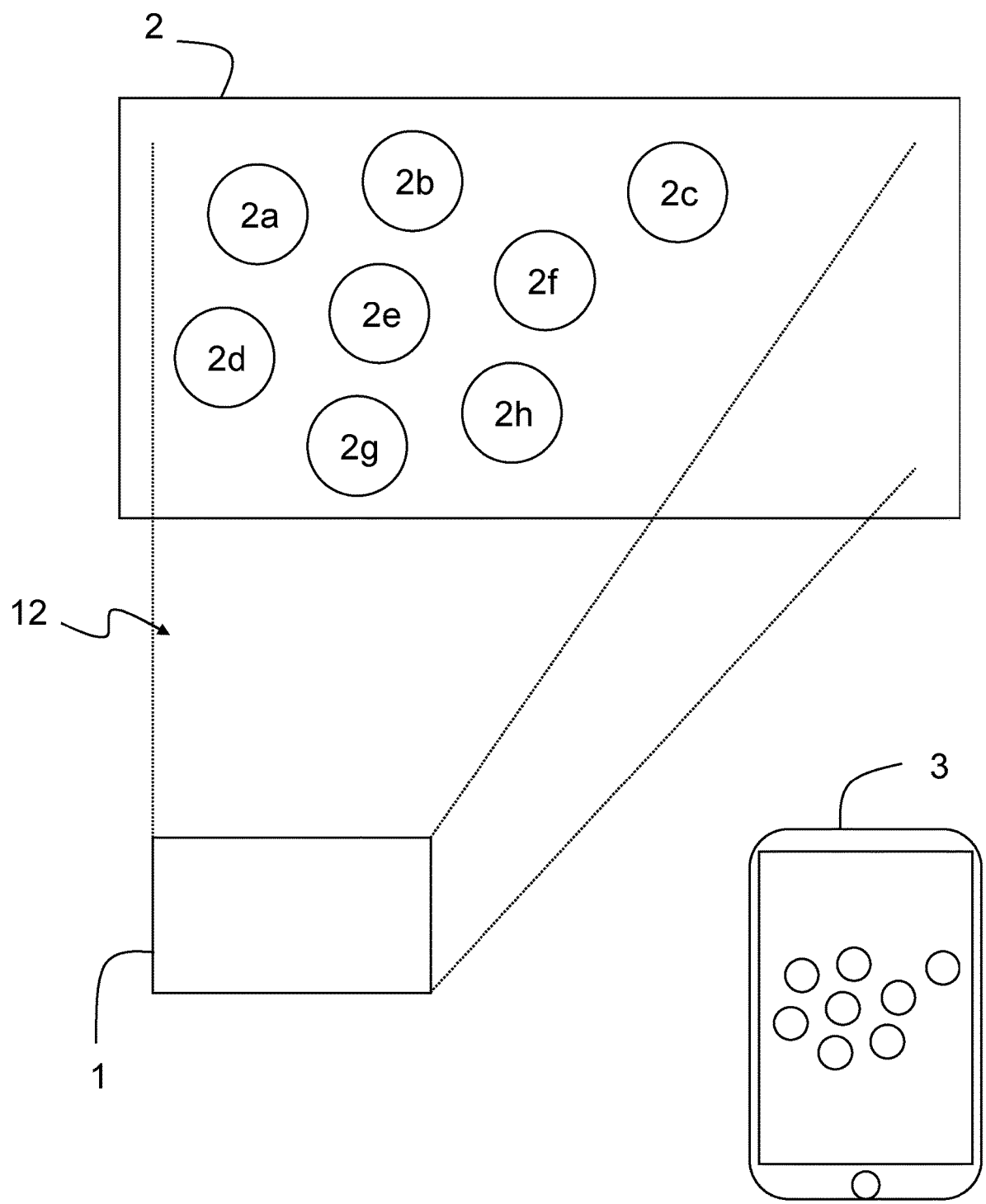
FIGS. 2a and 2b show two concept diagrams of two possible embodiments of the system object of the present invention.

FIG. 2a illustrates such a configuration: assuming that all the lighting elements 1a-1h are all activated, the lighting device 1 emits a light beam 12, which is projected onto a projection surface 2.

As shown in FIG. 2, the light beam 12 is projected onto the surface 2 and creates a plurality of light points 2a-2h on such a surface.

Each light point corresponds to a lighting element, whereby the lighting element 1a generates the light point 2a, the lighting element 1b generates the light point 2b, and so on for all the light points.

Figure 1:
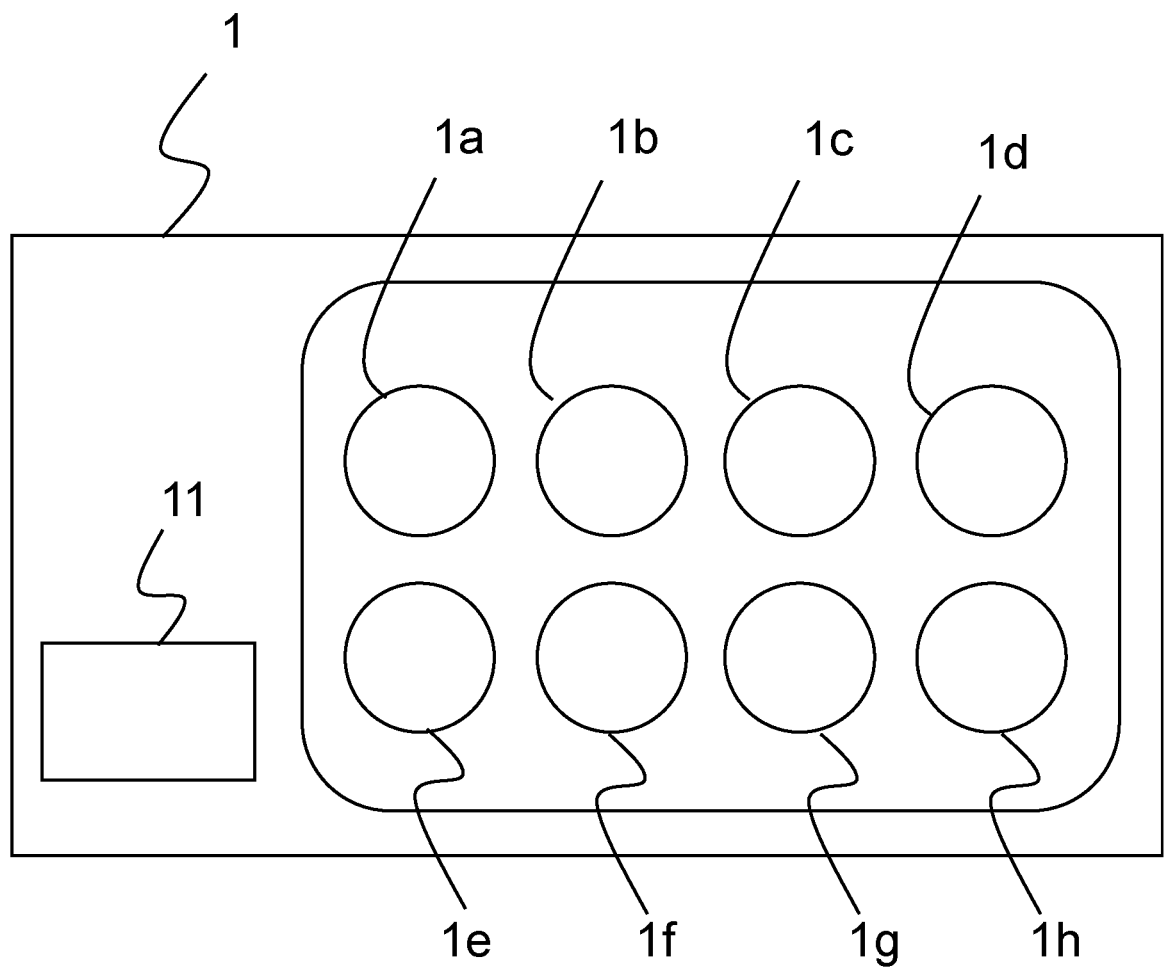
FIG. 1 shows a concept diagram of an embodiment of the lighting device belonging to the system object of the present invention.

As shown in FIG. 1, preferably the positioning diagram of the lighting elements 1a-1h in the lighting device 1 is regular, i.e., they are distributed regularly.

With particular reference to the illustrated example, the eight lighting elements 1a-1h are arranged in two rows of four elements per row.

However, such a positioning diagram does not always correspond to the projection wall 2, for deviations of the light beam 12, and for production reasons and for the positioning of the lighting device 1.

The detection of the position of the light points 2a-2h is therefore fundamental for creating scenographies through the lighting device 1.

As will be described below, position detection is essential in the case of two or more lighting devices, where the light points can overlap or mix.

For this reason, the control unit 11 and the user device are configured to detect the spatial position of at least part of the light points 2a-2h.

The detection preferably can occur according to the methods described in patent application WO2017115326.

The user device 3 preferably consists of a portable device of the smartphone type or the like and comprises a camera for capturing a sequence of images of the environment in which the lighting device 1 is positioned.

The lighting device 1 instead comprises lighting elements consisting of RGB laser emission elements, while the control unit 11 is configured to implement a system configuration step in which it activates each lighting element 1a-1h according to a respective switching on sequence.

With particular reference to the figures, each lighting element 1a-1h has an address, i.e., an identification code, which allows it to receive operating instructions from the control unit 11, which knows all the addresses of the lighting elements 1a-1h.

The system just described is used to detect the position of the light points 2a-2h associated with the lighting elements 1a-1h.

In particular, the smartphone 3, through its own camera, captures a sequence of images of the light points 2a-2h, in order to identify them, detecting their position.

Preferably, the detection of the position of each light point 2a-2h, is carried out through the generation of an activation sequence of the lighting elements 1a-1h which includes setting different lighting states for each lighting element 1a-1h.

For example, the lighting elements 1a-1h can be controlled so that they switch on emitting lights of different colours.

It follows that also the light points 2a-2h, projected on the wall 2, will have different colourations from each other.

In this case, each lighting element 1a-1h can be adapted to emit light of different colours, so that during the capture of the plurality of images, each lighting element 1a-1h is controlled to generate a specific sequence of colours.

Consequently, the light points 2a-2h can also generate specific colour sequences, which give rise to lighting configurations, to "scenes", which will act as codes for the identification of the position, according to the methods described in patent application WO2017115326.

The use of different colouration sequences also favours the association of each light point 2a-2h with the corresponding lighting element 1a-1h, so that the system can identify a unique association between each lighting element and the generated light point.

The result of this mapping process is a two-dimensional model, in which the spatial coordinates of at least part, preferably all, of the light points 2a-2h, arranged on a plane, i.e., on the projection wall 2, have been detected.

As illustrated in FIG. 2a, the screen of the smartphone 3 shows the capture of the various scenes, i.e., of the various lighting configurations of the light points 2a-2h.

As anticipated, once the mapping step is completed, the system, through the smartphone 3 and/or the control unit 11, is aware of the positions of each light point, as well as the association between each light point and the lighting element which generated said light point.

It follows that a user, through the control unit 11 and the smartphone 3, can activate, in a controlled manner, the lighting elements 1a-1q, so that the result is a predetermined animation, the control unit being configured to implement a lighting program which takes into account the spatial positions of the determined light points.

In a completely similar manner, the system object of the present invention controls the switching on of a plurality of light points if two or more lighting devices are present.

Figure 2B:
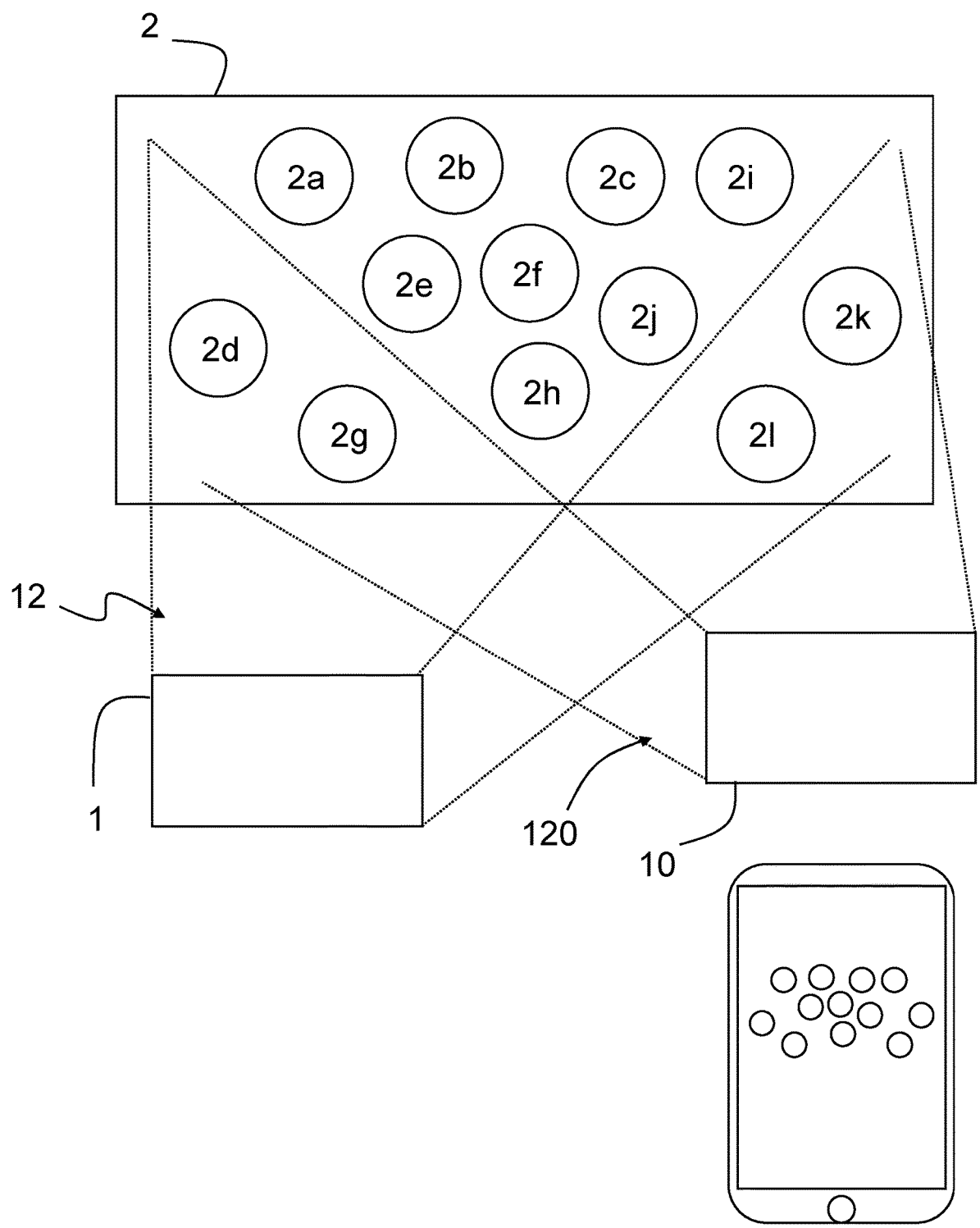

Such a configuration is illustrated in FIG. 2b, in which two lighting devices 1 and 10 are included, positioned so as to project their light beams 12 and 120 on a common projection wall 2.

In this case, the lighting device 1 generates, with its own light beam 12, the light points 1a, 1b, 1c, 1d, 1 e, 1f, 1f, 1h, while the lighting device 10 generates, with its own light beam 120, the light points 1i, 1j, 1k, 1l.

The method described above for calculating the position of each light point applies in a similar manner to the case of FIG. 2b.

The smartphone 3 communicates with the control units of the lighting devices 1 and 10, in order to coordinate the switching on of the lighting elements of such devices, so that they activate their lighting elements as if they were controlled by a single control unit.

Preferably, in fact, the smartphone 3 communicates with the two control units of the lighting devices 1 and 10 in order to create a single virtual lighting device which projects the sum of all the light points 2a-2l.

The creation of a single virtual lighting device can be carried out in any of any of the manners known in the state of the art.

Advantageously, an element of the "router" type or the like is included, to which all the lighting devices can be connected in order to coordinate the operation and execution of the light sequences, in a manner entirely similar to that described in document WO2018/158671, the contents of which are to be considered an integral part of the present patent application.

Alternatively, it is possible to include detecting the position of the light points generated by the lighting device 1, after which the position of the light points generated by the lighting device 10 can be detected.

Once the two two-dimensional models of the positions of the light points 2a-2h and the light points 2i-2l have been obtained, it is possible to join such models so as to create a single two-dimensional model.

From what has been described above, it is evident that the system object of the present application allows to use and manage any number of lighting devices and position them at different distances around an object to be illuminated and without the angle with which they project on the surface of the object affecting the final setting.

While the invention is susceptible to various modifications and alternative constructions, some preferred embodiments have been shown in the drawings and described in detail.

It should be understood, however, that there is no intention of limiting the invention to the specific illustrated embodiment but, on the contrary, it aims to cover all the modifications, alternative constructions, and equivalents falling within the scope of the invention as defined in the claims.

The use of "for example", "etc.", "or" refers to non-exclusive non-limiting alternatives, unless otherwise stated.

The use of "includes" means "includes but not limited to", unless otherwise stated.

The invention claimed is:

1. A lighting system comprising at least one lighting device configured to emit a light beam, which said at least one lighting device comprises a control unit configured to activate said at least one lighting device according to a predetermined lighting program, a user device adapted to communicate with said control unit being present, wherein said at least one lighting device comprises a plurality of lighting elements, each lighting element being configured to respond to control messages comprising an identification code of the lighting element and being configured to project a light point onto a projection surface, such that each light point is associated with a lighting element and in such a way that the light beam is made up of distinct light points, projected onto the projection surface, the control unit and the user device being configured to detect spatial position of said light points, the control unit being configured to implement a lighting program which takes into account the determined spatial positions of the light points.

2. The lighting system according to claim 1, wherein said user device comprises a camera for capturing a sequence of images of the environment in which said at least one lighting device is positioned, the control unit being configured to implement a system configuration step in which it activates each lighting element according to a respective switching on sequence, the user device being configured to analyse a sequence of images captured during the system configuration step to determine the spatial position of each light point on the projection surface and/or the identification code of the lighting element associated with the light point, and to send information to the control unit relative to the spatial position of each light point and the associated identification code of the lighting element.

3. The lighting system according to claim 2, wherein said lighting elements consist of RGB laser emission elements.

4. The lighting system according to claim 2, wherein there are two or more lighting devices arranged so as to project the light source on a common projection surface.

5. The lighting system according to claim 1, wherein said lighting elements consist of RGB laser emission elements.

6. The lighting system according to claim 5, wherein there are two or more lighting devices arranged so as to project the light source on a common projection surface.

7. The lighting system according to claim 1, wherein there are two or more lighting devices arranged so as to project the light beam on a common projection surface.

8. A method for controlling switching on of light emitted by at least one lighting device, comprising:

a) projecting a light beam constituted by a plurality of distinct light points onto a projection surface, the at least one lighting device comprising a plurality of lighting elements, each lighting element being configured to project a light point onto a projection surface, b) associating the light points with the corresponding lighting elements and detecting position of said light points, c) determining a switching on sequence of the lighting elements so that the lighting elements emit lights according to a lighting program, said lighting program including the projection of the light points according to a predetermined spatial order.

9. The method according to claim 8, wherein step b) includes the steps of:

capturing a sequence of images of the projection surface during the capture of the sequence of images, switching on at least part of the lighting elements according to a different sequence, which sequence allows to uniquely identify the light points associated with said lighting elements, analysing the sequence of images to determine a spatial position of the light points.

10. The method according to claim 9, wherein each lighting element is configured to respond to control messages comprising a unique code, said sequence comprising a plurality of switching on configurations of said lighting elements, each switching on configuration including activation of the lighting elements according to different colourations.

11. The method according to claim 9, wherein two or more lighting devices are present, and a step of positioning the lighting devices is included so as to project a light source onto a common projection surface.

12. The method according to claim 9, wherein N images are captured, where N is the lowest integer satisfying the equation $S^N>=L$, with L being the number of the lighting elements and S being the number of states which can be assumed by each lighting element.

13. The method according to claim 8, wherein each lighting element is configured to respond to control messages comprising a unique code, said sequence comprising a plurality of switching on configurations of said lighting elements, each switching on configuration including activation of the lighting elements according to different colourations.

14. The method according to claim 13, wherein two or more lighting devices are present, and a step of positioning the lighting devices is included so as to project a light source onto a common projection surface.

15. The method according to claim 13, wherein N images are captured, where N is the lowest integer satisfying the equation $S^N>=L$, with L being the number of the lighting elements and S being the number of states which can be assumed by each lighting element.

16. The method according to claim 8, wherein two or more lighting devices are present, and a step of positioning the lighting devices is included so as to project a light source onto a common projection surface.

17. The method according to claim 16, wherein N images are captured, where N is the lowest integer satisfying the equation $S^N>=L$, with L being the number of the lighting elements and S being the number of states which can be assumed by each lighting element.

18. The method according to claim 8, wherein N images are captured, where N is the lowest integer satisfying the equation $S^N>=L$, with L being the number of the lighting elements and S being the number of states which can be assumed by each lighting element.

19. The method according to claim 8, wherein the lighting program is set by a user by means of a user device operatively connected to a control unit adapted to control the switching on of said lighting elements.

* * * * *